(12) United States Patent
Jung et al.

(10) Patent No.: US 12,160,815 B2
(45) Date of Patent: Dec. 3, 2024

(54) SHORT-RANGE WIRELESS COMMUNICATION METHOD AND APPARATUS

(71) Applicant: Samsung Electronics Co., Ltd., Gyeonggi-do (KR)

(72) Inventors: Buseop Jung, Gyeonggi-do (KR); Soonho Lee, Gyeonggi-do (KR); Doosuk Kang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 371 days.

(21) Appl. No.: 17/869,945

(22) Filed: Jul. 21, 2022

(65) Prior Publication Data

US 2022/0361095 A1    Nov. 10, 2022

Related U.S. Application Data

(63) Continuation of application No. PCT/KR2020/017868, filed on Dec. 8, 2020.

(30) Foreign Application Priority Data

Jan. 30, 2020    (KR) .................. 10-2020-0011370

(51) Int. Cl.
*H04W 48/16* (2009.01)
*H04W 4/80* (2018.01)
(Continued)

(52) U.S. Cl.
CPC .............. *H04W 48/16* (2013.01); *H04W 4/80* (2018.02); *H04W 56/001* (2013.01); *H04W 84/18* (2013.01)

(58) Field of Classification Search
CPC ...... H04W 48/16; H04W 4/80; H04W 56/001; H04W 84/18
See application file for complete search history.

(56) References Cited

U.S. PATENT DOCUMENTS 9,480,013 B2   10/2016 Fang et al.
10,104,531 B2  10/2018 Huang et al.
(Continued)

FOREIGN PATENT DOCUMENTS

JP         2018-14574 A     1/2018
KR   10-2015-0128830 A     11/2015
(Continued)

*Primary Examiner* — Adam D Houston
(74) *Attorney, Agent, or Firm* — Cha & Reiter, LLC

(57) ABSTRACT

According to an embodiment, an electronic device may include: a wireless communication circuit for performing short-range wireless communication with at least one external electronic device; a memory; and a processor operatively connected to the wireless communication circuit and the memory. The processor may perform the short-range wireless communication with the at least one external electronic device via the wireless communication circuit, form a first neighbor awareness networking (NAN) cluster with the at least one external electronic device, on the basis of the short-range wireless communication, transmit a short-range wireless signal to the at least one external electronic device included in the first NAN cluster, and inactivate an NAN cluster merging function of the at least one external electronic device, using the short-range wireless signal. Various other embodiments may be possible.

20 Claims, 11 Drawing Sheets

(51) Int. Cl.
*H04W 56/00* (2009.01)
*H04W 84/18* (2009.01)

(56) References Cited

U.S. PATENT DOCUMENTS

| | | |
|---|---|---|
| 11,006,265 B2 * | 5/2021 | Sambe .................. H04L 67/303 |
| 11,082,503 B2 * | 8/2021 | Aoki ....................... H04L 67/51 |
| 2014/0254569 A1 | 9/2014 | Abraham et al. |
| 2015/0098388 A1 | 4/2015 | Fang et al. |
| 2015/0131529 A1 | 5/2015 | Zhou et al. |
| 2016/0286461 A1 | 9/2016 | Patil et al. |
| 2017/0070938 A1 | 3/2017 | Uno |
| 2017/0280377 A1 | 9/2017 | Patil et al. |
| 2018/0027366 A1 | 1/2018 | Fujimori |
| 2019/0020994 A1 * | 1/2019 | Fujimori ................ H04W 4/80 |
| 2021/0212167 A1 * | 7/2021 | Jung ...................... H04W 12/08 |
| 2022/0361095 A1 * | 11/2022 | Jung ........................ H04W 4/80 |
| 2023/0189118 A1 * | 6/2023 | Jung ..................... H04W 60/04 |
| | | 455/456.1 |
| 2024/0007838 A1 * | 1/2024 | Jung ..................... H04W 84/12 |
| 2024/0107432 A1 * | 3/2024 | Qi ......................... H04W 48/16 |

FOREIGN PATENT DOCUMENTS

| | | | |
|---|---|---|---|
| KR | 10-2017-0028845 A | | 3/2017 |
| KR | 10-2017-0056715 A | | 5/2017 |
| KR | 10-2018-0124881 A | | 11/2018 |
| KR | 20240045033 A | * | 4/2024 |
| KR | 20240052573 A | * | 4/2024 |
| KR | 20240063713 A | * | 5/2024 |
| WO | WO-2024096530 A1 | * | 5/2024 |
| WO | WO-2024155036 A1 | * | 7/2024 ............. H04L 67/51 |

* cited by examiner

FIG. 5
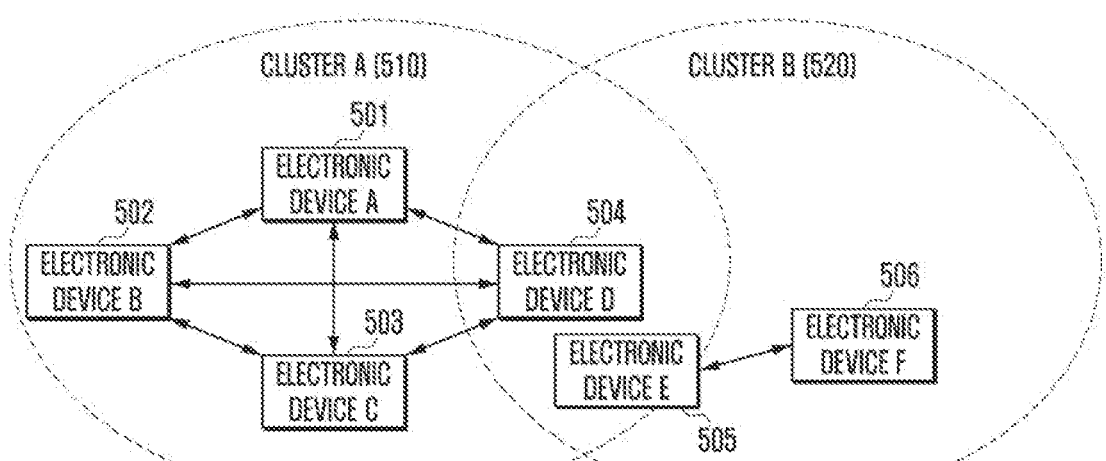
(a)
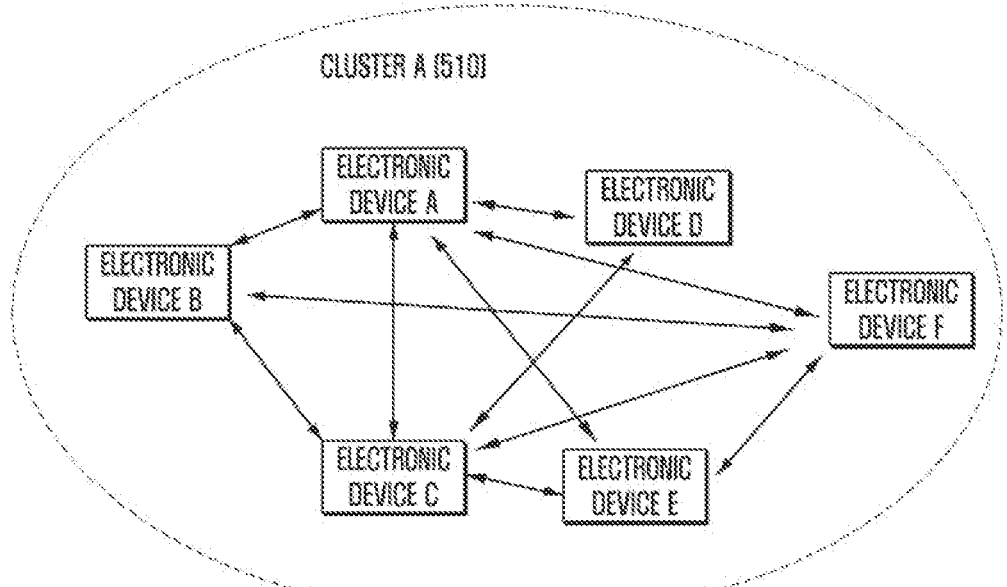
(b)

SHORT-RANGE WIRELESS COMMUNICATION METHOD AND APPARATUS

CROSS-REFERENCE TO RELATED APPLICATION(S)

This application is a continuation of, based on and claims priority under 35 U.S.C. § 120 to PCT International Application No. PCT/KR2020/017868, which was filed on Dec. 8, 2020, and claims priority to Korean Patent Application No. 10-2020-0011370, filed on Jan. 30, 2020, in the Korean Intellectual Property Office, the disclosure of which are incorporated by reference herein their entirety.

BACKGROUND

Technical Field

One or more embodiments of the instant disclosure generally relate to short-range wireless communication method and apparatus.

Description of Related Art

Various types of proximity communication services using short-range wireless communication technologies have been developed. For example, in one such proximity communication service, it is possible to exchange data through a proximity network that is configured for neighboring electronic devices (e.g. devices within 10 meters). The proximity communication service may be, for example, a low-power proximity communication service using Bluetooth low energy (BLE) or beacon, and the neighbor awareness networking (NAN) communication standard based on a wireless local area network (WLAN) may be applied thereto.

In NAN communication, an electronic device may synchronize a time clock with another electronic device in the NAN cluster. The electronic device may be in the wake state during a discovery window (DW) section, and may maintain the sleep state during a section outside the discovery window section, thereby reducing power consumption.

SUMMARY

The NAN cluster according to the NAN communication standard may include at least two electronic devices located within a close distance to each other, and may perform data communication in the discovery window section when synchronization of the time clock is performed. A plurality of NAN clusters may be formed, and in case that the NAN clusters overlap each other, at least one electronic device may be merged into a different NAN cluster based on a NAN cluster grade. For example, if the NAN cluster grade of a first NAN cluster is higher than that of a second NAN cluster when the first NAN cluster and the second NAN cluster overlap each other, at least one electronic device included in the second NAN cluster may be merged into the first NAN cluster.

For example, if a vehicle is moving while a plurality of electronic devices share the vehicle speakers of the vehicle (e.g., in a state where the first NAN cluster is formed), a situation may occur where the first NAN cluster overlaps another NAN cluster (e.g., second NAN cluster) having different synchronization information. In this case, if the grade of the first NAN cluster is higher than the grade of the second NAN cluster, some of the electronic devices included in the second NAN cluster may be merged into the first NAN cluster. The electronic devices included in the second NAN cluster may be merged into the first NAN cluster at different times, and depending on such merge time intervals, data communication cutoff (e.g., interruptions in audio playback) may occur.

According to an embodiment, an electronic device may include: a wireless communication circuit for performing short-range wireless communication with at least one external electronic device; a memory; and a processor operatively connected to the wireless communication circuit and the memory, wherein the processor is configured to: perform the short-range wireless communication with the at least one external electronic device through the wireless communication circuit, form a first neighbor awareness networking (NAN) cluster with the at least one external electronic device based on the short-range wireless communication, transmit a short-range wireless signal to the at least one external electronic device included in the first NAN cluster, and deactivate a NAN cluster merge function of the at least one external electronic device using the short-range wireless signal. A short-range wireless communication method according to an embodiment may include: performing the short-range wireless communication with at least one external electronic device through a wireless communication circuit; forming a first NAN cluster with the at least one external electronic device based on the short-range wireless communication; transmitting a short-range wireless signal to the at least one external electronic device included in the first NAN cluster; and deactivating a NAN cluster merge function of the at least one external electronic device using the short-range wireless signal.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 is a diagram illustrating an example of NAN cluster merge between NAN clusters in a proximity network according to an embodiment of the disclosure.

DETAILED DESCRIPTION

Certain embodiments of the disclosure can deactivate NAN cluster merge functions of electronic devices included in a plurality of NAN clusters so as to maintain communication quality in a situation where NAN clusters overlap each other. Certain embodiments of the disclosure can provide a method for maintaining communication quality and an electronic device therefor even in situations where NAN clusters overlap each other.

Certain embodiments of the disclosure can deactivate the NAN cluster merge function of the electronic device so that the electronic device included in the first NAN cluster is not merged into the second NAN cluster in the situation where the plurality of NAN clusters overlap each other. For example, since the electronic device included in the first NAN cluster is not merged into the other NAN cluster (e.g., second NAN cluster), wireless short-range communication based on the first NAN cluster can be smoothly performed without the communication cutoff.

According to the certain embodiments, in case that a plurality of NAN clusters overlaps each other, the communication quality of an electronic device can be prevented from being degraded by manipulating the NAN cluster merge operation.

Figure 1:
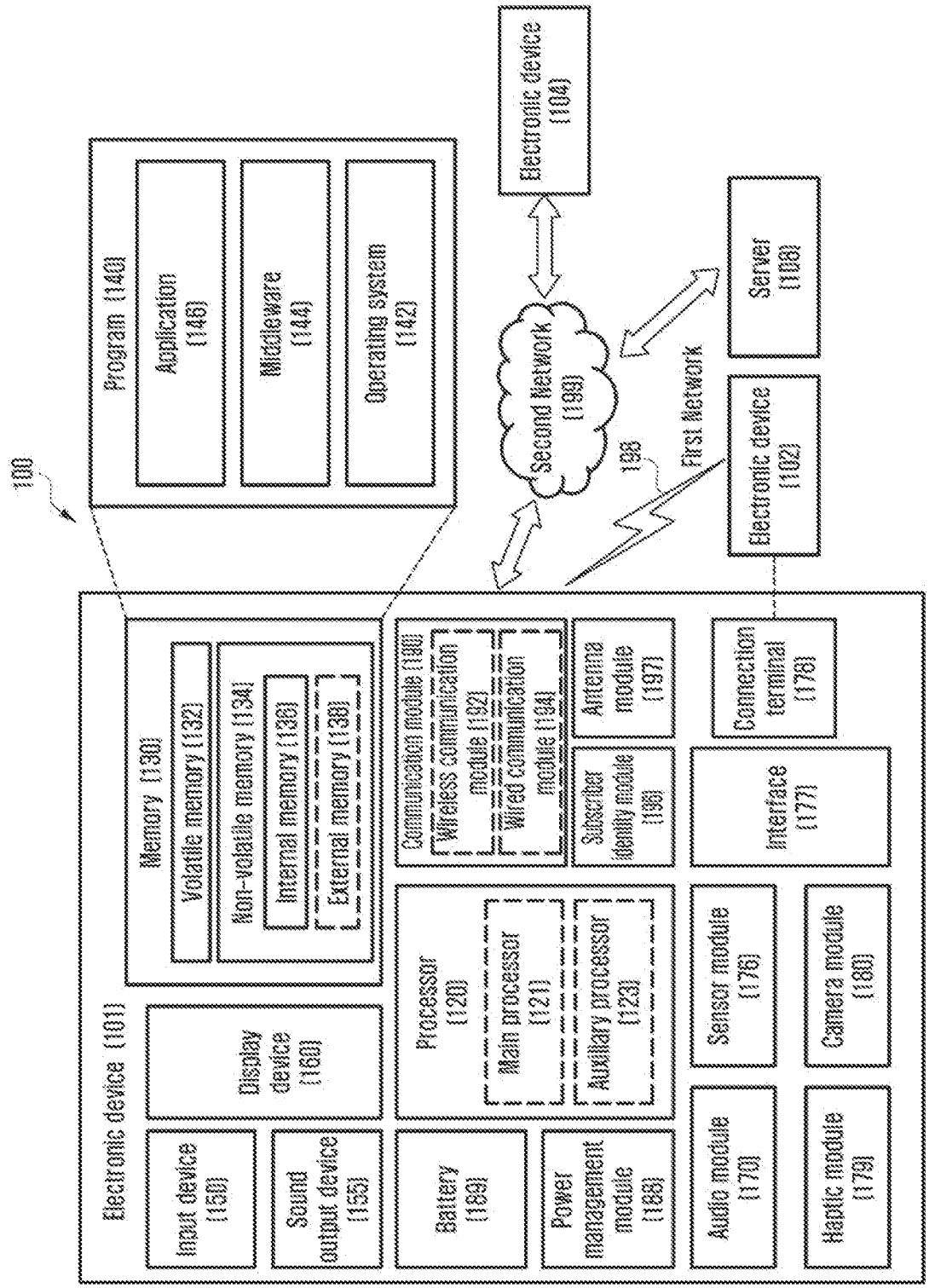
FIG. 1 is a block diagram of an electronic device in a network environment according to an embodiment of the disclosure.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. According to an embodiment, the wireless communication module 192 may identify and authenticate the electronic device 101 in a communication network, using subscriber information stored in the subscriber identification module 196.

The antenna module 197 may include at least one antenna for transmitting or receiving a signal or power to or from the outside. According to an embodiment, the communication module 190 (e.g., the wireless communication module 192) may transmit a signal to or receive a signal from an external electronic device through an antenna suitable for a communication scheme.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
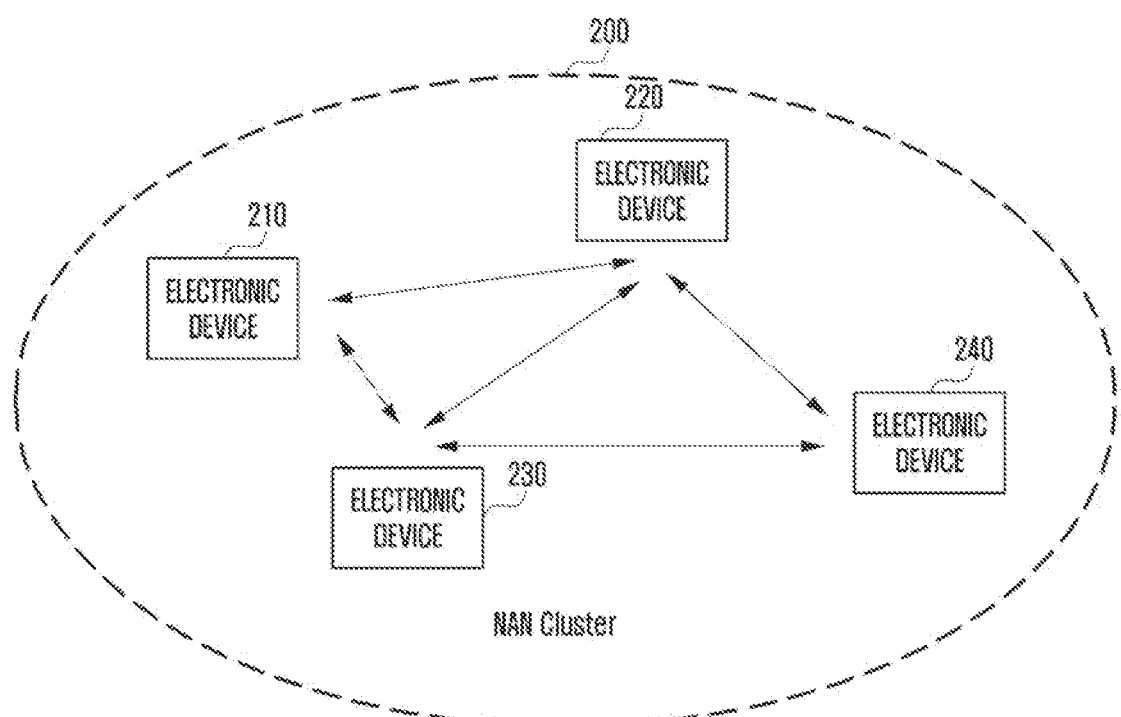
FIG. 2 is a diagram illustrating an example of a NAN cluster configuration for a proximity network according to an embodiment of the disclosure.

FIG. 2 is a diagram illustrating an example of a NAN cluster configuration for a proximity network according to an embodiment of the disclosure. Hereinafter, in the description, a NAN cluster 200 may refer to a set of electronic devices constituting a proximity network so that electronic devices 210, 220, 230, and/or 240 transmit and/or receive data with each other within the NAN cluster. For example, the NAN cluster 200 may be formed by at least one electronic device based on the NAN communication standard.

With reference to FIG. 2, the plurality of electronic devices 210, 220, 230, and 240 may constitute one NAN cluster 200. The electronic devices 210, 220, 230, and 240 included in the NAN cluster 200 may synchronize their time clocks with each other, and may transmit and receive a beacon and a service discovery frame within a discovery window (DW) section in accordance with the synchronized time clock. For example, the electronic devices 210, 220, 230, and 240 in the NAN cluster 200 may synchronize their time clocks with each other, and may give and take the beacon, service discovery frame (SDF), and/or NAN action frame (NAF) in the same discovery window section. According to an embodiment, the electronic device supporting the NAN-based low-power short-range communication technology may broadcast a search signal (e.g., beacon) for discovering other electronic devices at predetermined first cycles (e.g., about 100 msec), and may receive the search signal being broadcasted from other electronic devices by performing scanning at predetermined second cycles (e.g., about 10 msec).

According to an embodiment, the electronic device may recognize at least one other electronic device located around the electronic device based on the search signal received through the scanning, and may perform time synchronization and/or channel synchronization with the recognized at least one other electronic device. For example, as shown in FIG. 2, the plurality of electronic devices 210, 220, 230, and 240 may form one NAN cluster 200 by transmitting beacons and by receiving the beacons from the other electronic devices 210, 220, 230, and 240, and the electronic devices 210, 220, 230, and 240 belonging to the NAN cluster may perform the time synchronization and/or the channel synchronization.

According to an embodiment, the time synchronization and/or the channel synchronization may be performed based on the time and the channel of the electronic device having the highest master preference in the NAN cluster 200. For example, the electronic devices 210, 220, 230, and 240 in the NAN cluster 200 formed through discovery may exchange a signal about master preference information representing the preference for operating as an anchor master with each other, and may determine the electronic device having the highest master preference as the anchor master (or master device).

According to an embodiment, the anchor master may refer to the electronic device that is the standard for the time synchronization and/or the channel synchronization of the electronic devices 210, 220, 230, and 240 belonging to the NAN cluster 200. The anchor master may be changed depending on the master preference of the electronic device. According to an embodiment, each of the time-synchronized and/or channel-synchronized electronic devices 210, 220, 230, and 240 may transmit the beacon and the SDF in the discovery window (or search section) repeatedly in accordance with a predetermined cycle, and may receive the beacon and the SDF from other electronic devices belonging to the NAN cluster 200.

According to an embodiment, the beacon may be periodically transmitted and received for every discovery window in order to continuously maintain the time synchronization and/or the channel synchronization of the electronic devices 210, 220, 230, and 240 belonging to the NAN cluster 200.

According to an embodiment, the SDF may be transmitted and received during the discovery window, as needed, in order to provide a service with the searched electronic devices 210, 220, 230, and 240. According to an embodiment, the electronic device operating as the anchor master in the time-synchronized and/or channel-synchronized electronic devices 210, 220, 230, and 240 may transmit the beacon to detect a new electronic device in a time interval between the discovery windows.

According to an embodiment, each of the time-synchronized and channel-synchronized electronic devices 210, 220, 230, and 240 may transmit the NAN action frame (NAF) in the discovery window (or search section) repeatedly in accordance with the predetermined cycle, and may receive the NAF from the other electronic devices in the cluster 200. For example, the NAF may include information related to configuration of a NAN data path (NDP), information related to a schedule update, and/or information related to NAN ranging so that data communication can be performed in the section between the discovery windows. For example, the NAF may control scheduling of a wireless resource for coexistence of NAN operations and non-NAN operations (e.g., Wi-Fi Direct, mesh, IBSS, and WLAN). The NAF may include time information and/or channel information for NAN communication when NAN communication is available.

According to an embodiment, each of the electronic devices 210, 220, 230, and 240 in the NAN cluster 200 may operate in the active state only during the discovery window, and may operate in low power state (e.g., sleep state) during other sections outside the discovery window, thereby reducing power consumption. For example, the discovery window may be a time period (e.g., in the order of milliseconds) in which the electronic device is in the active state (or wake state), and may be a section in which a lot of power is consumed, whereas the section excluding the discovery window may be a section in which the electronic device maintains the sleep state, and operates in the low power state. Accordingly, the electronic devices 210, 220, 230, and 240 in the NAN cluster 200 may be simultaneously activated at the start time of the discovery window (e.g., DW start) synchronized by the time synchronization, and may be simultaneously switched over to the sleep state at the end time of the discovery window (e.g., DW end).

According to an embodiment, the electronic devices 210, 220, 230, and 240 in the NAN cluster 200 can exchange messages outside the discovery window section. For example, the electronic devices 210, 220, 230, and 240 in the NAN cluster 200 may perform additional communication by configuring an active time slot in a section between the discovery windows. For example, NAN communication and/or non-NAN communication connection may be performed by transmitting and receiving the SDF at an active time slot or at a designated NAN communication operation section and/or at a designated non-NAN communication operation section. The SDF may not be transmitted and received in the discovery window section. For example, the electronic devices 210, 220, 230, and 240 included in the NAN cluster 200 may exchange and/or share a discovery beacon, a synchronization beacon, and/or a service discovery frame by using a protocol illustrated in FIG. 3 below.

Figure 3:
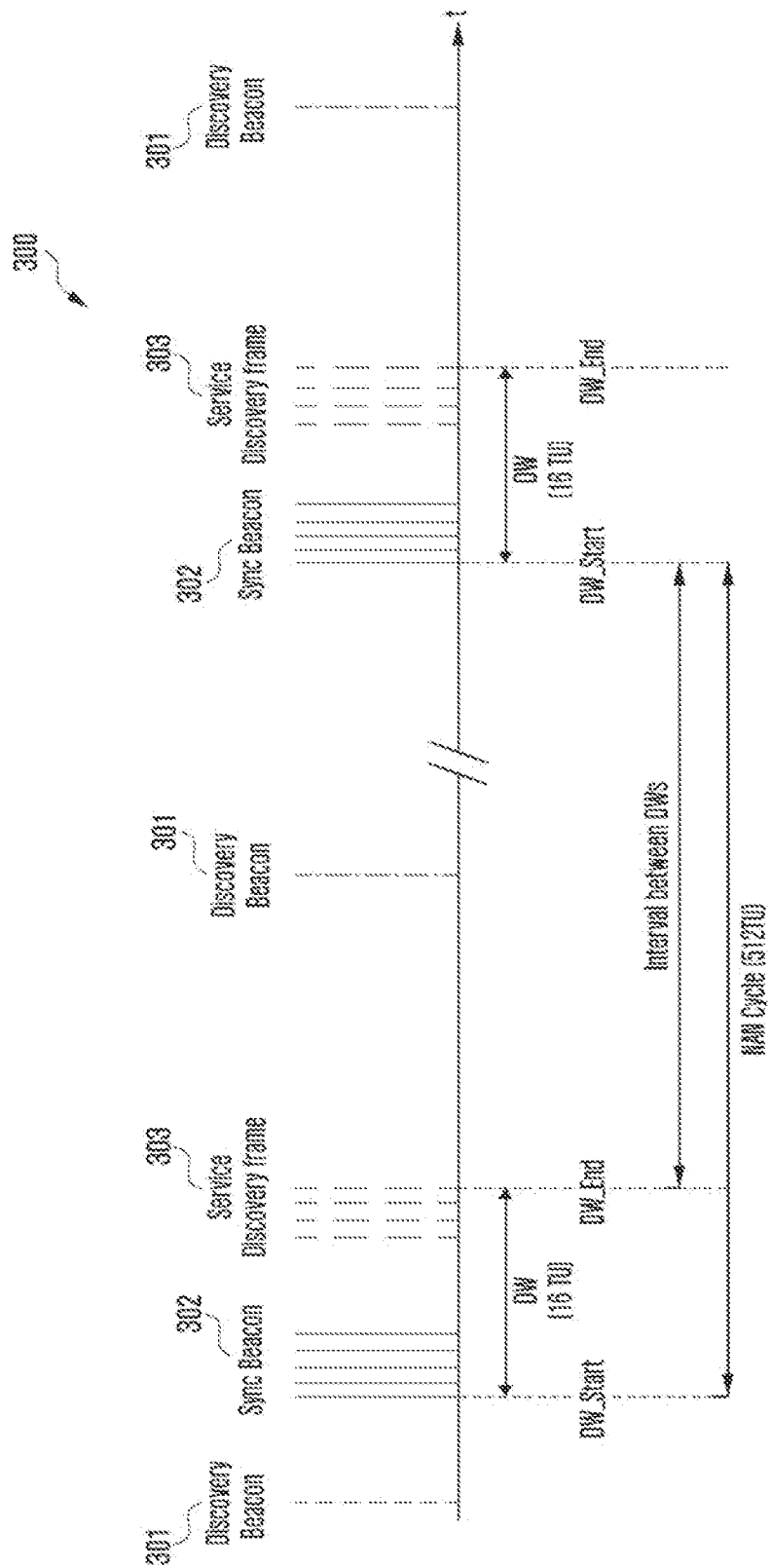
FIG. 3 is a diagram illustrating an example of a signal transmission protocol in a proximity network according to an embodiment of the disclosure.

FIG. 3 is a diagram illustrating an example of a signal transmission protocol in a proximity network according to an embodiment of the disclosure. Hereinafter, explanation will be made in the context of electronic devices included in one NAN cluster (e.g., NAN cluster 200 of FIG. 2) transmitting signals on a specific channel (e.g., channel 6) based on the NAN communication standard.

With reference to FIG. 3, the electronic devices may transmit a synchronization beacon 302 and a service discovery frame 303 in a discovery window (DW) section determined in the NAN communication standard, and may transmit a discovery beacon 301 in other sections outside the discovery window section.

The synchronization beacon 302 and the service discovery frame 303 may be transmitted based on competition between the electronic devices belonging to the cluster. The discovery window section may be a section in which the electronic device is switched over from the sleep state that is a power saving mode to the wakeup state for data exchange between the electronic devices. For example, the discovery window section may be divided into time units (TUs) of milliseconds. The discovery window section for transmitting and receiving the synchronization beacon 302 and the service discovery frame 303 may occupy 16 time units (16 TUs) and may have a cycle repeated with 512 time units (512 TUs) in accordance with the NAN communication standard.

With reference to FIG. 3, the discovery beacon 301 may be a signal that is transmitted so that other electronic devices having been unable to participate in the NAN cluster can discover the NAN cluster. The discovery beacon 301 is a signal for notifying of the existence of the NAN cluster, and in order to participate in the NAN cluster, the electronic devices not within the cluster can receive the discovery beacon 301 by performing of the passive scan. The passive scan may be a function for the electronic device to receive the discovery beacon 301 corresponding to the NAN cluster in order to participate in the NAN cluster.

The discovery beacon 301 may include necessary information for synchronization with the NAN cluster. For example, the discovery beacon 301 may include at least one of a frame control (FC) field indicating a function (e.g., beacon) of a signal, a broadcast address, a media access control (MAC) address of a transmission device, a NAN cluster identifier, a sequence control, a time stamp for a beacon frame, a beacon interval representing the transmission interval of the discovery beacon, and/or capability information on the transmission device.

The discovery beacon 301 may include an information element related to at least one proximity network (or cluster), and the information related to the proximity network may be called attribute information.

The synchronization beacon 302 may be a signal for maintaining the synchronization between the respective electronic devices belonging to the NAN cluster. The synchronization beacon 302 may include necessary information for synchronization with the NAN cluster. For example, the synchronization beacon 302 may include at least one of an FC field indicating a function (e.g., beacon) of a signal, a broadcast address, a MAC address of a transmission device, a NAN cluster identifier, a sequence control field, a time stamp for a beacon frame, a beacon interval field representing the interval between discovery window (DW) start points, and/or capability information on the transmission device. The synchronization beacon 302 may include at least one piece of proximity network related information (i.e. attribute information).

The service discovery frame 303 is a signal for exchanging data through the proximity network, and the proximity network related information may include content for the proximity network service. The service discovery frame 303 is a vender specific public action frame, and may include various fields. For example, the service discovery frame 303 may include a category or an action field, and may include at least one piece of proximity network related information.

The discovery beacon 301 may include the proximity network related information. The proximity network related information may include an identifier representing the kind of information, a length of information, and a body field that is the corresponding information. For example, the corresponding information may include at least one of master indication information, cluster information, service identifier list information, service descriptor information, connection capability information, wireless LAN infrastructure information, peer to peer (P2P) operation information, independent basic service set (IBSS) information, mesh information, further proximity network service discovery information, further availability map information, country code information, ranging information, cluster discovery information, and/or vender specific information.

Figure 4:
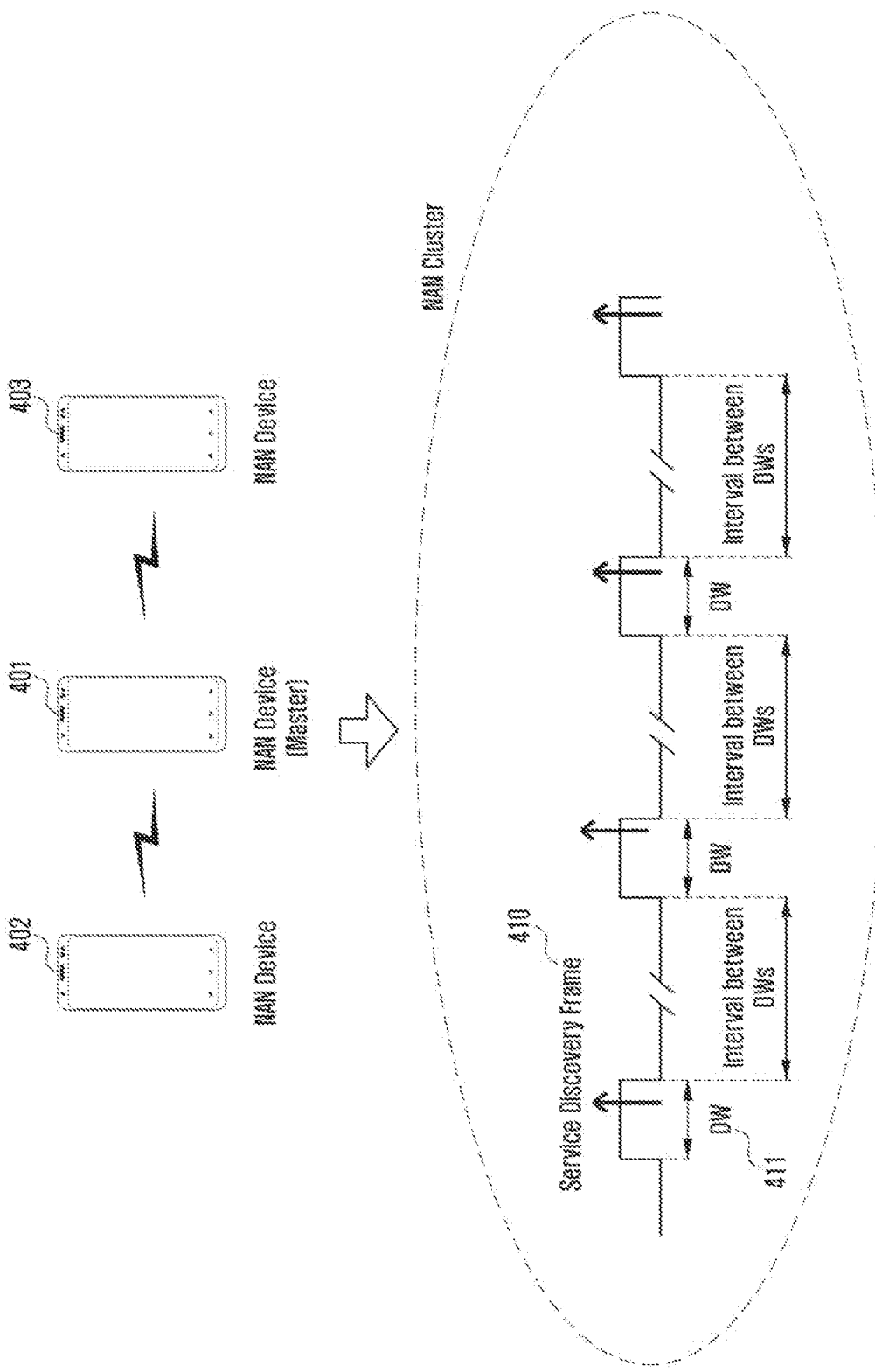
FIG. 4 is a diagram illustrating an example of data exchange in a NAN cluster according to an embodiment of the disclosure.

FIG. 4 is a diagram illustrating an example of data exchange in a NAN cluster according to an embodiment of the disclosure. With reference to FIG. 4, at least one electronic device 401 constituting the NAN cluster may play the role of the master electronic device.

For example, the electronic device 401 may transmit a service discovery frame (SDF) 410 in a discovery window (DW) section 411 in accordance with the NAN communication standard, and other electronic devices 402 and 403 constituting the cluster may receive the service discovery frame. The beacon being transmitted in the discovery window (DW) section 411 may include a synchronization beacon, and may include information for maintaining synchronization between the electronic devices. In case that the time in which the master electronic device (e.g., electronic device 401) transmits a NAN discovery beacon and the discovery window section 411 overlap each other, the transmission of the NAN discovery beacon may be omitted.

In a section outside the discovery window (DW) section 411 (e.g., section between the discovery window (DW) sections), the electronic device 401 and other electronic devices 402 and 403 may maintain the sleep state that is a power saving mode in order to reduce power consumption. For example, since the electronic devices 401, 402, and 403 constituting the cluster operate in the wakeup state only in the discovery window (DW) section 411, as determined by the time clock of the electronic devices, power consumption can be reduced.

FIG. 5 is a diagram illustrating an example of a NAN cluster merge between NAN clusters in a proximity network according to an embodiment of the disclosure.

With reference to FIG. 5, a NAN cluster A 510 may be configured to include a plurality of electronic devices (e.g., electronic device A 501, electronic device B 502, electronic device C 503, and/or electronic device D 504), and a NAN cluster B 520 may be configured to include electronic device E 505 and/or electronic device F 506.

According to an embodiment, in case that at least parts of NAN cluster A 510 and NAN cluster B 520 overlap each other, as shown in (b) of FIG. 5, the NAN cluster A 510 and the NAN cluster B 520 may be merged into one NAN cluster (e.g., NAN cluster A 510) based on attributes (e.g., size, area, and/or range of a cluster) of the NAN clusters. For example, the NAN cluster range of the NAN cluster A 510 and the NAN cluster B 520 may be changed by the movement of at least one electronic device synchronized in the respective NAN clusters. Accordingly, a situation may occur in which the NAN cluster A 510 and the NAN cluster B 520, which previously were not adjacent to each other, may overlap each other, or may become adjacent to each other. As another example, in case that signal strength of at least one electronic device synchronized in the NAN cluster A 510 and the NAN cluster B 520 is changed, the NAN cluster range may be changed. Accordingly, a situation may occur in which the NAN cluster A 510 and the NAN cluster B 520, which previously were not adjacent to each other, may overlap each other, or may become adjacent to each other.

In an embodiment, when receiving proximity service data (e.g., discovery beacon and/or synchronization beacon) of the NAN cluster B 520, electronic device D 504 of the NAN cluster A 510 may determine that the NAN cluster B 520 overlaps or is adjacent to the NAN cluster A 510. For example, in case of receiving the discovery beacon (e.g., discovery beacon 301 of FIG. 3) transmitted by the master electronic device (e.g., electronic device E 505) of the NAN cluster B 520, the electronic device D 504 of the NAN cluster A 510 may determine that the NAN cluster B 520 overlaps or is adjacent to the NAN cluster A 510. The electronic device D 504 may select the cluster to be synchronized by comparing attributes (e.g., grade and cluster grade) of the NAN cluster A 510 and the NAN cluster B 520 with each other. For example, if it is determined that the NAN cluster A 510 is larger, the electronic device D 504 may maintain the synchronization of the NAN cluster A 510 as shown in (b) of FIG. 5. For example, the proximity service data may include at least one of the discovery beacon, the synchronization beacon, or the service discovery frame. For example, the discovery beacon and/or the synchronization beacon may include cluster information. According to an embodiment, if the proximity service data is received from another cluster (e.g., NAN cluster B 520), the electronic device D 504 of the NAN cluster A 510 may identify that the other cluster is present around the electronic device D 504.

In another embodiment, when receiving proximity service data (e.g., discovery beacon and/or synchronization beacon) of the NAN cluster A 510, electronic device E 505 of the NAN cluster B 520 may determine that the NAN cluster A 510 overlaps or is adjacent to the NAN cluster B 520. For example, in case of receiving the discovery beacon (e.g., discovery beacon 301 of FIG. 3) transmitted by the master electronic device (e.g., electronic device A 501) of the NAN cluster A 510, the electronic device E 505 of the NAN cluster B 520 may determine that the NAN cluster A 510 overlaps or is adjacent to the NAN cluster B 520. The electronic device E 505 may select the cluster to be synchronized by comparing attributes (e.g., grade and cluster grade) of the NAN cluster A 510 and the NAN cluster B 520 with each other. For example, if it is determined that the NAN cluster A 510 is larger, the electronic device E 505 may be synchronized with the NAN cluster A 510 as shown in (b) of FIG. 5. According to an embodiment, when the electronic device included in the NAN cluster B 520 is included in and synchronized with the NAN cluster A 510 may be referred to as the electronic device being merged into the NAN cluster A 510.

According to an embodiment, at least one electronic device belonging to the NAN cluster may transmit the proximity service data (e.g., discovery beacon, synchronization beacon, and/or service discovery frame). The proximity service data may include information related to the NAN cluster. When receiving the proximity service data from another device, the at least one electronic device may determine that another NAN cluster overlaps or is adjacent to the at least one electronic device.

Figure 6:
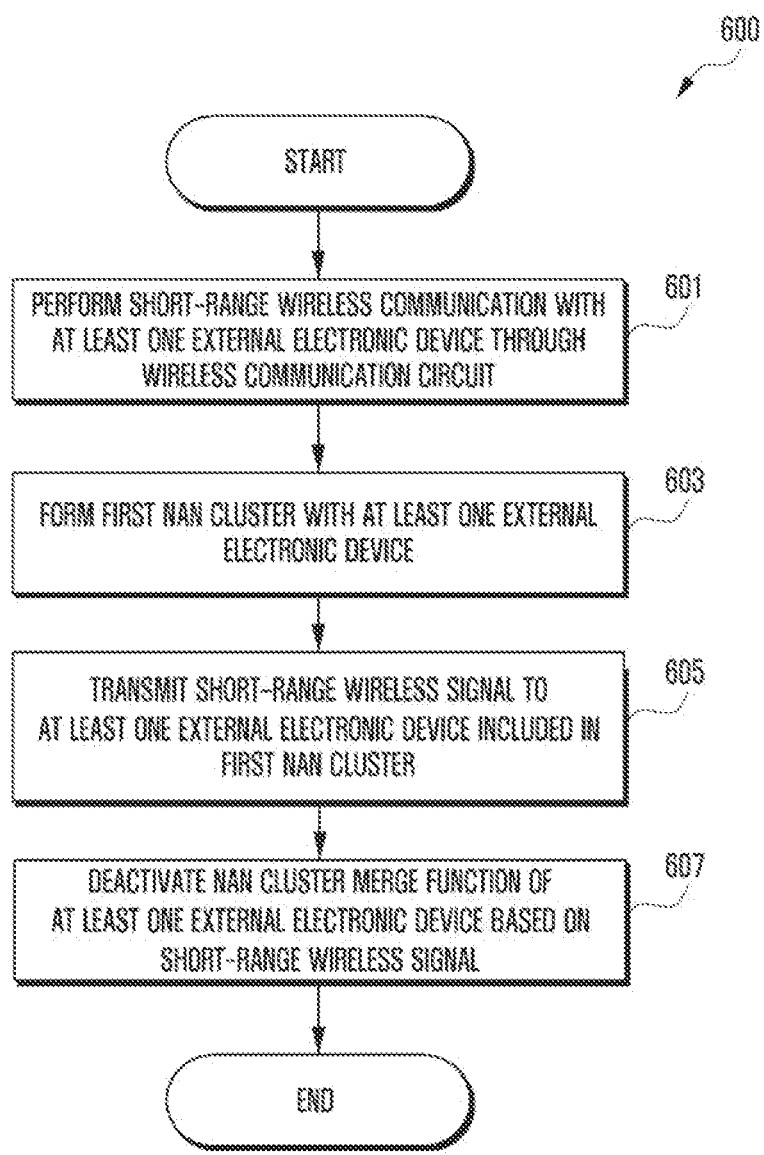
FIG. 6 is a flowchart for a method for deactivating a NAN cluster merge function of at least one electronic device included in one NAN cluster in a proximity network according to an embodiment of the disclosure.

FIG. 6 is a flowchart 600 for a method for deactivating a NAN cluster merge function of at least one electronic device included in one NAN cluster in a proximity network according to an embodiment of the disclosure.

With reference to FIG. 6, at operation 601, the processor (e.g., processor 120 of FIG. 1) of the electronic device (e.g., electronic device 101 of FIG. 1) may perform short-range wireless communication with at least one external electronic device (e.g., electronic device 102 of FIG. 1) through a wireless communication circuit (e.g., communication module 190 of FIG. 1). For example, the electronic device 101 and the at least one external electronic device 102 may support NAN communication, and may transmit and receive data for activating NAN communication. According to an embodiment, the short-range wireless communication may be NAN communication in accordance with the NAN communication standard. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed as means-plus-function, unless the element is expressly recited using the phrase "means for." In addition, an artisan understands and appreciates that a "processor" or "microprocessor" may be hardware in the claimed disclosure.

At operation 603, the electronic device 101 may form a first NAN cluster with the at least one external electronic device 102. The first NAN cluster may be composed of the electronic device 101 and the at least one external electronic device 102 based on a short-range wireless communication network (e.g., first network 198 of FIG. 1). For example, the electronic device 101 may obtain discovery window (DW) section information for the at least one external electronic device 102 belonging to the first NAN cluster. The discovery window section may be a section (e.g. time interval) in which the electronic devices are switched over from sleep state to wakeup state in order to perform data exchange between the respective electronic devices. The electronic devices included in the first NAN cluster may transmit and receive a beacon and/or a service discovery frame within the discovery window (DW) section. The electronic devices may exchange at least one signal such as a discovery beacon, a synchronization beacon, and/or a service discovery frame with each other, and may perform time synchronization and/or channel synchronization. The electronic devices may transmit and receive synchronization related information in the discovery window (DW) section, and may operate in a low power state (e.g., sleep state or sleep mode) in the other sections outside the discovery window (DW) section. For example, the electronic device 101 and the at least one external electronic device 102 may minimize the power consumption by means of a power management module (e.g., power management module 188 of FIG. 1) in the other sections outside the discovery window (DW) section.

At operation 605, the electronic device 101 may transmit a short-range wireless signal to the at least one external electronic device 102 included in the first NAN cluster. For example, the short-range wireless signal may include the discovery beacon, the synchronization beacon, the service discovery frame (SDF), a NAN action frame (NAF), and/or a BLE message. The short-range wireless signal may include information (e.g., name, ID, and/or address of the external electronic device 102) of the at least one external electronic device 102 receiving the signal. The short-range wireless signal may include an ID representing the first NAN cluster.

According to an embodiment, the short-range wireless signal may include information (e.g., 0 or 1) for controlling activation and deactivation of the NAN cluster merge function for the at least one external electronic device 102. For example, if the information is 0, the at least one external electronic device 102 may deactivate the NAN cluster merge function, and may be blocked from being merged into another cluster (e.g., second cluster). For example, if the information is 1, the at least one external electronic device 102 may activate the NAN cluster merge function, and in case that the first cluster overlaps the other cluster (e.g., second cluster), it may be merged into the other NAN cluster.

According to an embodiment, the short-range wireless signal may be transmitted based on the SDF. The SDF format is as in Table 1 below.

TABLE 1

| Field | Size(Octets) | Value(Hex) | Description |
| --- | --- | --- | --- |
| Category | 1 | 0x04 or 0x09 | IEEE 802.11 Public Action Frame or Protected Dual of Public Action Frame |
| Action | 1 | 0x09 | IEEE 802.11 Public Action Frame Vender Specific |
| OUI | 3 | 0x50-6F-9A | Wi-Fi Alliance specific OUI |
| OUI Type | 1 | 0x13 | Identifying the type and version of the NAN |
| NAN attributes | Variable | Variable | One of more NAN attribute |

According to an embodiment, the SDF based short-range wireless signal may include one or more pieces of attribute information (e.g., master indication attribute, cluster attribute, service ID attribute, service descriptor attribute, service descriptor extended attribute, and/or NAN connection capability attribute) including various pieces of information in the NAN attribute field.

According to an embodiment, the electronic device 101 may transmit information for controlling activation and/or deactivation of the NAN cluster merge function for the at least one external electronic device 102 by utilizing the service descriptor attribute field and the service descriptor extended attribute field of the attribute information.

According to an embodiment, the service descriptor attribute format is as in Table 2 below.

TABLE 2

| Field | Size (Octets) | Value (Hex) | Description |
| --- | --- | --- | --- |
| Attribute ID | 1 | 0x03 | Identifies the type of NAN attribute |
| Length | 2 | Variable | Length of the following fields in the attribute |
| Service ID | 6 | Variable | Mandatory field that contains the hash of the Service Name |
| Instance ID | 1 | Variable | Publish_ID or Subscribe_ID Value of zero is reserved |
| Requestor Instance ID | 1 | Variable | Instance ID from the frame that triggered the transmission if available, otherwise set to 0x00. |
| Service Control | 1 | Variable | Mandatory field that defines the Service Control bitmap as defined in Table 42 |
| Binding Bitmap | 0 or 2 | 0x0000 to 0xFFFF | Optional field that indicates the binding of the SDA to post discovery connection attributes |
| Matching Filter Length | 0 or 1 | Variable | An optional field and present if a matching service discovery filter is used |
| Matching Filter | Variable | Variable | An optional field that is a sequence of length and value pairs that identify the matching service discovery filters |

TABLE 2-continued

| Field | Size (Octets) | Value (Hex) | Description |
|---|---|---|---|
| Service Response Filter Length | 0 or 1 | Variable | An optional field and present if a service response filter is used |
| Service Response Filter | Variable | Variable | An optional field that identifies the matching service response filters |
| Service Info Length | 0 or 1 | Variable | An optional field and present if service specific information is used |
| Service Info | Variable | Variable | An optional field that contains the service specific information |

According to an embodiment, the service descriptor extended attribute format is as in Table 3 below.

TABLE 3

| Field | Size (Octets) | Value (Hex) | Description |
|---|---|---|---|
| Attribute ID | 1 | 0x0E | Identifies the type of NAN attribute |
| Length | 2 | 0 or 1 | Length of the following fields in the attribute |
| Instance ID | 1 | Variable | The same value as in the Instance ID field of the associated Service Descriptor attribute |
| Control | 2 | Variable | Information about the fields present |
| Range Limit | 4 | 0 or 4 | Range Limit given in centimeters |
| Service Update Indicator | 1 | 0 or 2 | |
| Service Info Length | 0 or 2 | Variable | Length of the Service Info field. An optional field and present if Service Info field is present |
| Service Info | Variable | Variable | An optional field that contains the service specific information |

With reference to Table 2 and Table 3 as described above, Service Info field is included in both the service descriptor attribute format and the service descriptor extended attribute format, and in the Service Info field, various pieces of information may be designated and utilized. According to an embodiment, the electronic device 101 may transmit information for controlling activation and/or deactivation of the NAN cluster merge function to the at least one external electronic device 102 by utilizing the Service Info field.

According to an embodiment, the short-range wireless signal may be transmitted based on the NAN action frame (NAF). The NAF format is as in Table 4 below.

TABLE 4

| Field | Size(Octets) | Value(Hex) | Description |
|---|---|---|---|
| Category | 1 | 0x04 or 0x09 | IEEE 802.11 Public Action Frame or IEEE 802.11 Protected Dual of Public Action Frame |
| Action | 1 | 0x09 | IEEE 802.11 Public Action Frame Vender Specific |
| OUI | 3 | 0x50-6F-9A | Wi-Fi Alliance specific OUI |
| OUI Type | 1 | 0x18 | Identifying the type and version of the NAN |
| OUI Subtype | 1 | Variable | Identifying the type of NAN Action frame. |
| Information Content | Variable | Variable | Including fields and/or attributes for each specific NAN action frames |

With reference to Table 4, OUI Subtype may discriminate the type of NAN action to be performed, and Information Content may include various pieces of attribute information corresponding to the particular action.

Table 5 below illustrates the various subtypes of the NAN action frame in accordance with the NAN communication standard.

TABLE 5

| OUI Subtype | Notes |
| --- | --- |
| 0 | Reserved |
| 1 | Ranging Request |
| 2 | Ranging Response |
| 3 | Ranging Termination |
| 4 | Ranging Report |
| 5 | Data Path Request |
| 6 | Data Path Response |
| 7 | Data Path Confirm |
| 8 | Data Path Key Installment |
| 9 | Data Path Termination |
| 10 | Schedule Request |
| 11 | Schedule Response |
| 12 | Schedule Confirm |
| 13 | Schedule Update Notification |
| 14-255 | Reserved |

According to an embodiment, the electronic device 101 may select one of reserved 14 to 255 in Table 5 as described above, and may transmit the information for controlling the activation and/or deactivation of the NAN cluster merge function for the at least one external electronic device 102 by utilizing the selected field.

According to another embodiment, the electronic device 101 may define a separate vendor specific attribute in the NAF, and may transmit the information for controlling the activation and deactivation of the merge function for the at least one external electronic device 102 by utilizing the vendor specific attribute. The vendor specific attribute format is as in Table 6 below.

TABLE 6

| Field | Size(Octets) | Value(Hex) | Description |
| --- | --- | --- | --- |
| Attribute ID | 1 | 0xDD | Identifies the type of NAN attribute |
| Length | 2 | Variable | Length of the following fields in the attribute |
| OUI | 3 | Variable | Vendor Specific OUI |
| Body | Variable | Variable | Vendor Specific body that is implementation specific |

According to another embodiment, the electronic device 101 may transmit the information for controlling the activation and/or deactivation of the NAN cluster merge function for the at least one external electronic device 102 by utilizing a body field in the vendor specific attribute format.

According to an embodiment, the electronic device 101 may store, in the short-range wireless signal, the information for controlling the activation and/or deactivation of the NAN cluster merge function for the at least one external electronic device 102, and may transmit the short-range wireless signal to the at least one external electronic device 102. At operation 607, the electronic device 101 may deactivate the NAN cluster merge function of the at least one external electronic device based on the short-range wireless signal. For example, the short-range wireless signal may include information for deactivating the NAN cluster merge function of the at least one external electronic device 102. The electronic device 101 may at least partly control the at least one external electronic device 102.

According to an embodiment, the electronic device 101 may form one NAN cluster with the at least one external electronic device 102, and may identify at least one electronic device belonging to the NAN cluster. Based on the at least one electronic device belonging to the NAN cluster, the electronic device 101 may identify a NAN-based service target and/or connection target, and may deactivate the NAN cluster merge function for the identified target.

According to an embodiment, the electronic device 101 may determine whether to activate and/or deactivate the NAN cluster merge function based on a NAN communication based signal, a NAN communication based service, a location, time, and state (e.g., movement speed of the electronic device and/or connection state with other electronic devices) of the electronic device belonging to the NAN cluster, and/or a specific communication state (e.g., BT file share and/or specific access point (AP).

According to an embodiment, by deactivating the NAN cluster merge function for the at least one external electronic device 102, the electronic device 101 may maintain the quality of the short-range wireless network communication based on the first NAN cluster. According to an embodiment, if the NAN cluster merge function is deactivated, the at least one external electronic device 102 may not be able to merge into another NAN cluster even if the external electronic device 102 enters the communication area (range) of the other NAN cluster. According to an embodiment, if the at least one external electronic device 102 enters the communication area of the other NAN cluster when the NAN cluster merge function is activated, the at least one external electronic device 102 may compare the cluster grade (CG) of the current NAN cluster with the cluster grade of the other NAN cluster, and if the cluster grade of the other NAN cluster is higher than that of the current NAN cluster, the current NAN cluster may be merged into the other NAN cluster. According to an embodiment, the communication circuit (e.g., communication module 190 of FIG. 1) of the at least one external electronic device 102 may receive, from the electronic device 102, a signal for determining the activation and deactivation of the NAN cluster merge function. According to another embodiment, if the NAN cluster merge function is activated, the at least one external electronic device 102 may be switched over from low power state (e.g., sleep state) to active state (or wake state) in order to receive beacon information being transmitted from the other NAN cluster.

According to another embodiment, the at least one external electronic device 102 may receive the signal for determining the activation and deactivation of the NAN cluster merge function from the electronic device 101, and may display a notification corresponding to the received signal through a display. The at least one external electronic device 102 may determine whether to activate or deactivate the NAN cluster merge function in accordance with a user's input for the notification. According to an embodiment, the processor (e.g., processor 120 of FIG. 1) of the at least one external electronic device 102 may receive the user's input for determining the activation and deactivation of the NAN cluster merge function, and may transmit the signal for determining the activation and deactivation of the NAN cluster merge function to the communication circuit (e.g., communication module 190 of FIG. 1) based on the received input.

Figure 7:
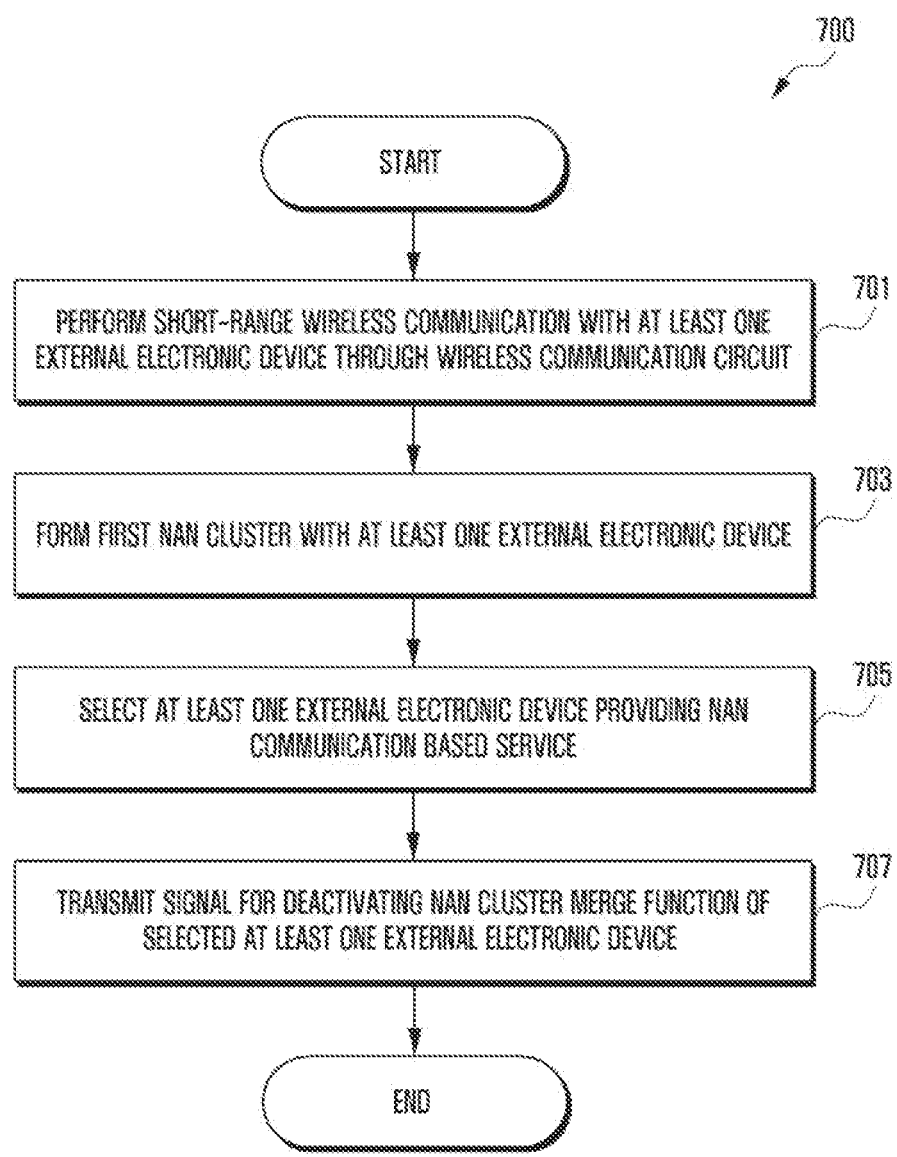
FIG. 7 is a flowchart illustrating a method for deactivating a NAN cluster merge function of at least one electronic device included in one NAN cluster in a proximity network according to an embodiment of the disclosure.

According to another embodiment, the at least one external electronic device 102 may deactivate the NAN cluster merge function based on determination of the NAN communication based service target and/or connection target from the electronic device 101. For example, the external electronic device 102 may deactivate the NAN cluster merge function when receiving the service discovery frame from the electronic device 101. FIG. 7 is a flowchart 700 illustrating a method for deactivating a NAN cluster merge function of at least one electronic device included in one NAN cluster in a proximity network according to an embodiment of the disclosure.

With reference to FIG. 7, at operation 701, the processor (e.g., processor 120 of FIG. 1) of the electronic device (e.g., electronic device 101 of FIG. 1) may perform short-range wireless communication with at least one external electronic device (e.g., electronic device 102 of FIG. 1) through the wireless communication circuit (e.g., communication module 190 of FIG. 1). For example, the electronic device 101 may transmit and receive data with the at least one external electronic device 102 based on the NAN communication standard.

According to an embodiment, the electronic device 101 and the external electronic device 102 may support NAN communication, and may transmit and receive data for activating NAN communication. For example, the electronic device 101 may transmit a first BLE transport discovery service (TDS) advertisement packet to the external electronic device 102 by using Bluetooth low energy (BLE) communication. The first BLE TDS advertisement packet may include service information and/or service group information related to the NAN communication generated according to a hash method. The external electronic device 102 may determine whether the service group information included in the first BLE TDS advertisement packet and the service group information (e.g., service group information registered in a BLE scan filter) of the external electronic device 102 match each other. The external electronic device 102 may transmit a second BLE TDS advertisement packet to the electronic device 101 in response to the reception of the first BLE TDS advertisement packet. The second BLE TDS advertisement packet may be a response signal of the first BLE TDS advertisement packet. The second BLE TDS advertisement packet may include the service group information of the external electronic device 102 generated by the hash method. The electronic device 101 may determine whether the service group information included in the second BLE TDS advertisement packet and the service group information (e.g., service group information registered in a BLE scan filter) of the electronic device 101 match each other. If the service group information matches each other, the NAN communication functions of the electronic device 101 and the external electronic device 102 may be activated, and the electronic device 101 may be connected to the external electronic device 102 to perform NAN communication.

At operation 703, the electronic device 101 may form the first NAN cluster with the at least one external electronic device 102. The first NAN cluster may refer to a group of electronic devices in a proximity network so that the electronic device 101 and the external electronic devices 102 can transmit and/or receive data with each other. For example, the electronic device 101 and the external electronic devices 102 included in the first cluster may be synchronized with each other, and may exchange data with each other. The electronic device 101 and the external electronic device 102 may perform the NAN communication based service with each other. According to an embodiment, the electronic device 101 may obtain discovery window (DW) section information for the at least one external electronic device 102. In order to transmit and receive synchronization information with the electronic devices included in the first NAN cluster, the electronic device 101 may obtain the discovery window (DW) section information for the at least one external electronic device 102.

At operation 705, the electronic device 101 may select the at least one external electronic device 102 providing the NAN communication based service from among the at least one external electronic device included in the first NAN cluster. According to an embodiment, the electronic device 101 may control to deactivate the NAN cluster merge function of the at least one external electronic device 102 so that the selected at least one external electronic device 102 performs the NAN communication based service without interruption.

At operation 707, the electronic device 101 may transmit the signal for deactivating the NAN cluster merge function to the at least one external electronic device 102. According to an embodiment, the signal for deactivating the NAN cluster merge function may be based on the NAN communication standard signal (e.g., service discovery frame (SDF), NAN action frame (NAF), and/or BLE message). For example, the NAN communication standard signal may include the information for controlling the activation and deactivation of the NAN cluster merge function for the selected at least one external electronic device 102. In an embodiment, the electronic device 101 may deactivate the NAN cluster merge function of the at least one external electronic device 102 so that the selected at least one external electronic device 102 may not merge with a second NAN cluster based on the information included in the NAN communication standard signal. For example, the electronic device 101 may store information (0 or 1) for controlling the activation and deactivation for the NAN cluster merge function in at least one field constituting the NAN communication standard signal, and may transmit the NAN communication standard signal to the selected at least one electronic device.

According to an embodiment, the at least one external electronic device 102 belonging to the NAN cluster may deactivate the merge function so that it cannot merge into another NAN cluster based on the information included in the NAN communication standard signal. For example, the at least one external electronic device 102 may display a user interface for determining the activation/deactivation of the NAN cluster merge function on the display, and may determine the deactivation of the NAN cluster merge function in response to the user's input. According to another embodiment, the at least one external electronic device 102 may transmit a response signal for the activation and deactivation of the NAN cluster merge function to the electronic device 101. According to an embodiment, the at least one external electronic device 102 may interrupt a passive scan function it is currently undertaking in order to deactivate the merge function into another NAN cluster. For example, when the passive scan function is interrupted, the at least one external electronic device 102 may not be changed from the low power state (e.g., sleep state) to the active state (or wake state) in order to receive beacon information being transmitted from the other cluster. As another example, when the passive scan function is interrupted, the at least one external electronic device 102 may disregard the beacon information being transmitted from another NAN cluster.

According to another embodiment, the at least one external electronic device 102 having the deactivated NAN cluster merge function may interrupt transmission of a beacon signal for notification of the NAN cluster to which the external electronic device 102 belongs. For example, the at least one external electronic device 102 having the deactivated NAN cluster merge function may interrupt the transmission of the beacon signal corresponding to the NAN cluster to which the external electronic device 102 belongs while disregarding the beacon signal being transmitted from another NAN cluster.

According to an embodiment, the electronic device 101 may deactivate the NAN cluster merge function to stably operate the NAN cluster (e.g., first cluster), and may interrupt the transmission of the beacon signal for notifying the external electronic device that is outside the NAN cluster (e.g., first cluster) of the NAN cluster (e.g., first cluster). For example, the electronic device 101 may interrupt the passive scan function, and may interrupt the transmission of the beacon signal corresponding to the NAN cluster to which the electronic device 101 belongs.

Figure 8:
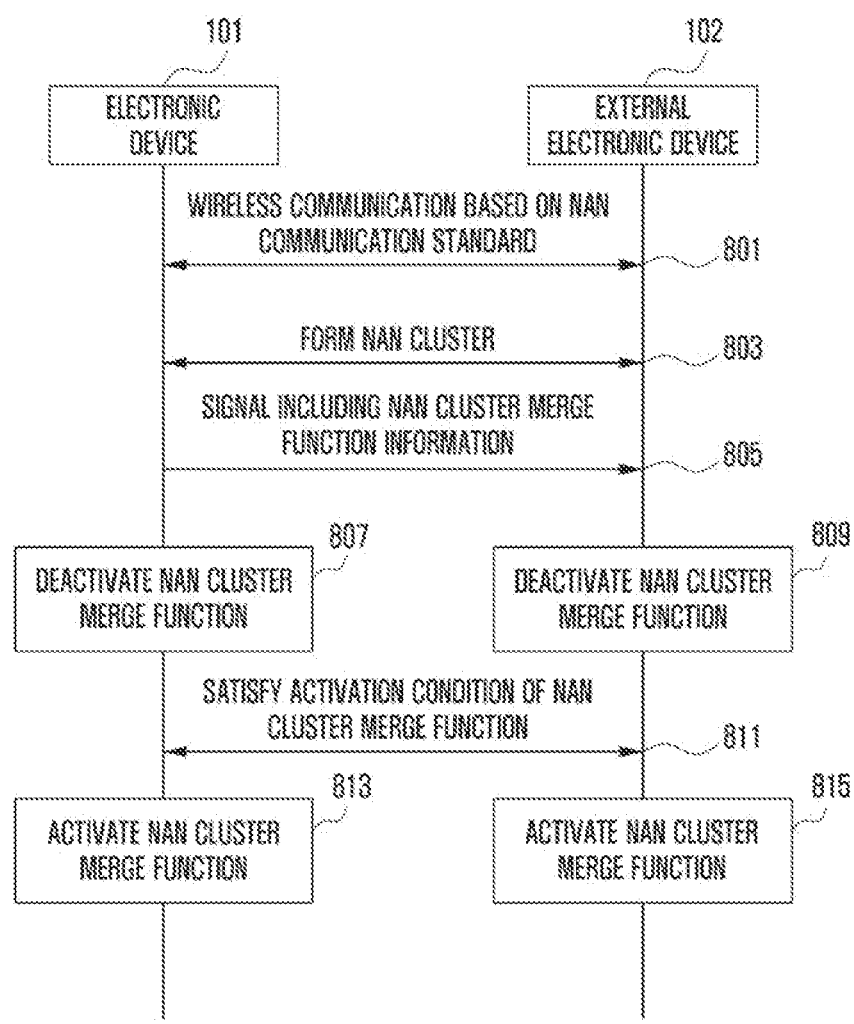
FIG. 8 is a diagram illustrating a process in which an electronic device controls to deactivate a NAN cluster merge function of an external electronic device included in the same NAN cluster in a proximity network according to an embodiment of the disclosure.

FIG. 8 is a diagram illustrating a process in which an electronic device controls to deactivate a NAN cluster merge function of an external electronic device included in the same NAN cluster in a proximity network according to an embodiment of the disclosure.

With reference to FIG. 8, the proximity network based wireless communication between the electronic device (e.g., electronic device 101 of FIG. 1) and the external electronic device (e.g., electronic device 102 of FIG. 1) is illustrated. At operation 801, the electronic device 101 and the external electronic device 102 may perform wireless communication based on the NAN communication standard. For example, the electronic device 101 and the external electronic device 102 may exchange data with each other through a proximity network.

At operation 803, the electronic device 101 and the external electronic device 102 may form a NAN cluster (e.g., first NAN cluster). For example, the electronic device 101 and the external electronic device 102 may share NAN cluster based synchronization information. According to an embodiment, the external electronic device 102 may transmit section information of a discovery window (DW) to the electronic device 101. For example, in order for the electronic device 101 and the external electronic device to share the synchronization information to form the NAN cluster, the electronic device 101 may obtain the discovery window section information from the external electronic device 102. The discovery window section information may include information for a section in which electronic devices are switched from the sleep state to the wakeup state for data exchange between the respective electronic devices.

At operation 805, the electronic device 101 may transmit a signal including NAN cluster merge function information to the external electronic device 102 based on the section information of the discovery window. According to an embodiment, the signal including the NAN cluster merge function information is a signal based on the NAN communication standard, and data for commanding the deactivation of the NAN cluster merge function may be included in at least one field constituting the signal. For example, the electronic device 101 may control to deactivate the NAN cluster merge function of the external electronic device 102 so that the proximity network communication (e.g., service based on the NAN communication) implemented based on the NAN cluster (e.g., first cluster) formed at operation 803 is not cut off. According to another embodiment, based on the external electronic device 102 belonging to the NAN cluster, the electronic device 101 may identify a service target and/or a connection target based on the NAN communication, and may deactivate the NAN cluster merge function for the identified target.

According to another embodiment, in case that the electronic device 101 and/or the external electronic device 102 are determined as the NAN communication based service target and/or connection target, the NAN cluster merge function for the electronic device 101 and/or the external electronic device 102 may be deactivated. For example, in case of a designated condition (e.g., designated service connection, designated location, designated time, designated state (e.g., fast speed movement or connection with an automobile), or designated communication (e.g., BT file share or the same AP connection)), the electronic device 101 and/or the external electronic device 102 may deactivate the NAN cluster merge function for the electronic device 101 and/or the external electronic device 102.

At operation 807, the electronic device 101 may deactivate the NAN cluster merge function so that the electronic device 101 is not merged with another NAN cluster (e.g., second NAN cluster). At operation 809, the external electronic device 102 may also deactivate the NAN cluster merge function so as not to be merged with the other NAN cluster. According to an embodiment, the electronic device 101 and the external electronic device 102 may maintain the quality of the proximity network communication based on the NAN communication. The electronic device 101 and the external electronic device 102 may not receive or may disregard the beacon signal (e.g., beacon information) being transmitted from the other NAN cluster. According to another embodiment, the electronic device 101 and the external electronic device 102, when the NAN cluster merge function is deactivated, may interrupt the transmission of the beacon signal for notification of the NAN cluster to which they belong.

At operation 811, the electronic device 101 and the external electronic device 102 may identify the activation condition of the NAN cluster merge function, and if the activation condition is satisfied, they may switch the NAN cluster merge function from being deactivated to being activated. For example, the activation condition of the NAN cluster merge function may include a condition where a group having been provided with the NAN communication service is released, a condition where the NAN communication service is ended, a condition where a service group based on NAN communication is created, a condition where a specific service based on NAN communication is performed together with the external electronic device 102, and/or a condition where the NAN cluster merge function is activated based on a priority for the specific service. If the activation condition of the NAN cluster merge function is satisfied at operation 811, the electronic device 101 may activate the deactivated NAN cluster merge function again at operation 813, and the external electronic device 102 may also activate the deactivated NAN cluster merge function again at operation 815.

According to an embodiment, if the NAN cluster is formed with the external electronic device 102, the electronic device 101 may control the external electronic device 102 at least partly so that the NAN cluster merge function for the external electronic device 102 is deactivated. According to an embodiment, if the NAN cluster merge function is deactivated, the electronic device may interrupt the transmission of the beacon signal for notification of the NAN cluster to which the electronic device 101 belongs. According to an embodiment, as the NAN cluster merge function is deactivated, the external electronic device 102 is not merged into the other NAN cluster, and thus the service quality based on the NAN communication may be maintained. The electronic device 101 and the external electronic device 102 may use the service based on the NAN communication without communication interruption.

According to an embodiment, the electronic device 101 may include a wireless communication circuit 190 for performing short-range wireless communication with at least one external electronic device, a memory 130, and a processor 120 operatively connected to the wireless communication circuit 190 and the memory 130. The processor 120 may perform the short-range wireless communication with the at least one external electronic device 102 through the wireless communication circuit 190, form a first neighbor awareness networking (NAN) cluster with the at least one external electronic device 102 based on the short-range wireless communication, transmit a short-range wireless signal to the at least one external electronic device 102 included in the first NAN cluster, and deactivate a NAN cluster merge function of the at least one external electronic device 102 using the short-range wireless signal.

According to an embodiment, the short-range wireless communication may include a short-range wireless network based on the neighbor awareness networking (NAN) communication standard, and the processor 120 may exchange information related to the short-range wireless communication with the at least one external electronic device 102 through the wireless communication circuit based on discovery window section information corresponding to the first NAN cluster.

According to an embodiment, the short-range wireless signal may include a service discovery frame of the NAN communication standard applied to the short-range wireless communication, a NAN action frame (NAF), and/or a Bluetooth low energy (BLE) message.

According to an embodiment, the short-range wireless signal may include information for controlling deactivation of the NAN cluster merge function of the at least one external electronic device 102.

According to an embodiment, the processor 120 may receive a response signal for determining whether to deactivate the NAN cluster merge function from the at least one external electronic device 102, and deactivate the NAN cluster merge function of the at least one external electronic device 102 based on the response signal.

According to an embodiment, the deactivation of the NAN cluster merge function may include interruption of a passive scan function of the at least one external electronic device 102 so that the at least one external electronic device 102 is prevented from merging with a second NAN cluster.

According to an embodiment, the passive scan function may include a function of searching and/or receiving beacon information being transmitted from the external electronic device 102 included in the second NAN cluster, and the processor 120 may interrupt the passive scan function by not searching the beacon information corresponding to the second NAN cluster or by blocking reception of the beacon information.

A short-range wireless communication method according to an embodiment may include: performing the short-range wireless communication with at least one external electronic device 102 through a wireless communication circuit 190; forming a first NAN cluster with the at least one external electronic device 102 based on the short-range wireless communication; transmitting a short-range wireless signal to the at least one external electronic device 102 included in the first NAN cluster; and deactivating a NAN cluster merge function of the at least one external electronic device 102 using the short-range wireless signal.

According to an embodiment, the short-range wireless communication may include a short-range wireless network based on the neighbor awareness networking (NAN) communication standard. The method according to an embodiment may further include exchanging information related to the short-range wireless communication with the at least one external electronic device through the wireless communication circuit 190 based on discovery window section information corresponding to the first NAN cluster.

According to an embodiment, the short-range wireless signal may include a service discovery frame of the NAN communication standard applied to the short-range wireless communication, a NAN action frame (NAF), and/or a Bluetooth low energy (BLE) message.

According to an embodiment, the short-range wireless signal may include information for controlling deactivation of the NAN cluster merge function of the at least one external electronic device 102.

According to an embodiment, deactivating the NAN cluster merge function may include: receiving a response signal for determining whether to deactivate the NAN cluster merge function from the at least one external electronic device 102; and deactivating the NAN cluster merge function of the at least one external electronic device 102 based on the response signal.

According to an embodiment, deactivation of the NAN cluster merge function may include interruption of a passive scan function of the at least one external electronic device so that the at least one external electronic device is prevented from merging with a second NAN cluster.

According to an embodiment, the passive scan function may include a function of searching and/or receiving beacon information being transmitted from an external electronic device included in the second NAN cluster. Interrupting the passive scan function according to an embodiment may further include: not searching the beacon information corresponding to the second NAN cluster; and blocking reception of the beacon information.

Figure 9:
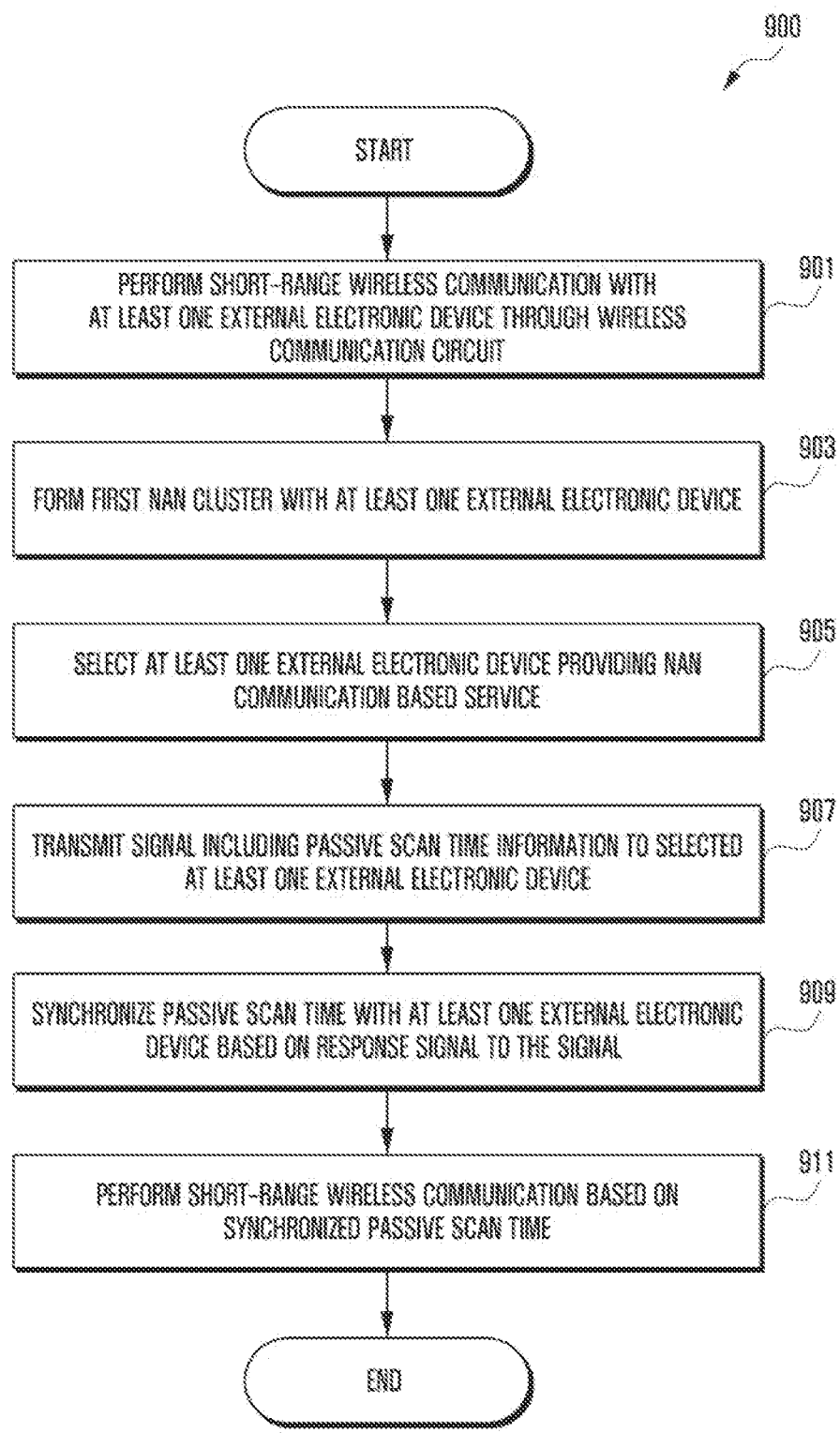
FIG. 9 is a flowchart illustrating a method for synchronizing passive scan time information between an electronic device included in the same NAN cluster and at least one external electronic device according to an embodiment of the disclosure.

FIG. 9 is a flowchart 900 illustrating a method for synchronizing passive scan time information between an electronic device included in the same NAN cluster and at least one external electronic device according to an embodiment of the disclosure.

With reference to FIG. 9, description of operation 901 to operation 905 is the same as the description of operation 701 to operation 705 in FIG. 7, and therefore duplicative description is omitted below.

At operation 907, the electronic device 101 may transmit a signal including passive scan time information (e.g., start time, duration, and/or cycle) to the selected at least one external electronic device 102. According to an embodiment, the electronic device 101 may include the passive scan time information in a NAN communication standard signal (e.g., service discovery frame (SDF), NAN action frame (NAF), and/or Bluetooth low energy (BLE) message) to be transmitted. The passive scan function may be a function for searching another NAN cluster (e.g., second NAN cluster), and the other NAN cluster may be searched based on the passive scan time information. According to an embodiment, the selected at least one external electronic device 102 may transmit a response signal to the signal received from the electronic device 101 to the electronic device 101.

At operation 909, the electronic device 101 may synchronize the passive scan time with the at least one external electronic device 102 based on the response signal to the signal. The electronic device 101 having the synchronized passive scan time may transmit a discovery beacon based on the passive scan time so that other external electronic devices having been unable to participate in the first NAN cluster discover the existence of the first NAN cluster. If the transmitted discovery beacon is received, the other external electronic devices may participate in the first cluster. As another example, the passive scan function may be a function for the electronic device 101 belonging to the NAN cluster (e.g., first NAN cluster) and the at least one external electronic device 102 to search another NAN cluster (e.g., second NAN cluster). According to an embodiment, the electronic device 101 belonging to the first cluster and the at least one external electronic device 102 may perform the passive scan function based on the synchronized passive scan time information (e.g., start time, duration, and/or cycle). According to an embodiment, in case that the electronic device 101 belonging to the same NAN cluster and the at least one external electronic device 102 discover the other NAN cluster based on the synchronized passive scan time and participate in the other NAN cluster, the electronic device 101 and the at least one external electronic device 102 may participate in the other NAN cluster substantially at the same time.

At operation 911, the electronic device 101 and the at least one external electronic device 102 may perform the short-range wireless communication (e.g., wireless communication based on the NAN communication standard) based on the synchronized passive scan time. According to an embodiment, the electronic device 101 and the at least one external electronic device 102 may participate in the same NAN cluster (e.g., first NAN cluster), and may maintain the quality of the short-range wireless communication corresponding to the NAN cluster. For example, in performing data transmission (e.g., music file transmission or data file transmission) between the electronic device 101 and the at least one external electronic device 102, data transmission error can be reduced. According to an embodiment, even if being merged into the other NAN cluster, the electronic device 101 and the at least one external electronic device 102 may be merged together based on the synchronized passive scan time, and thus the quality of the short-range wireless communication between the electronic device 101 and the at least one external electronic device 102 can be maintained.

Figure 10:
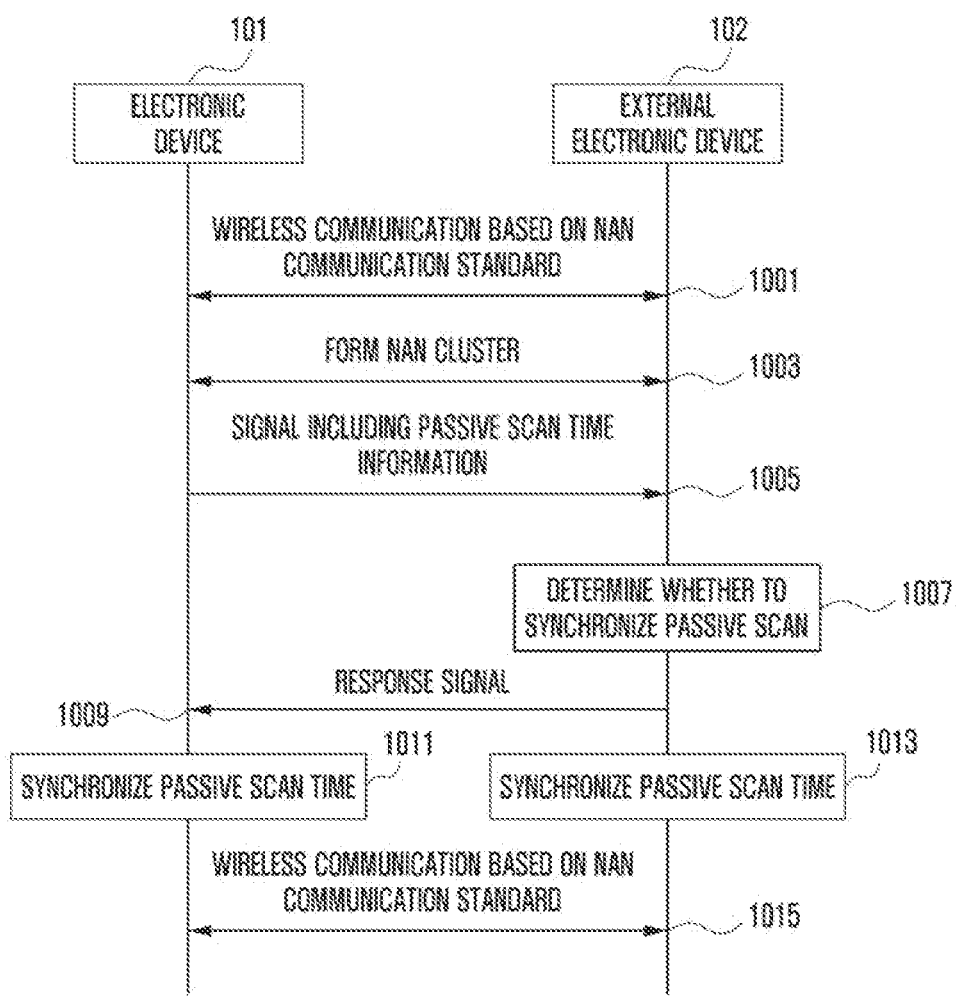
FIG. 10 is a diagram illustrating a process of synchronizing passive scan time information between an electronic device and at least one electronic device included in the same NAN cluster according to an embodiment of the disclosure.

FIG. 10 is a diagram illustrating a process of synchronizing passive scan time information between an electronic device and at least one electronic device included in the same NAN cluster according to an embodiment of the disclosure.

With reference to FIG. 10, description of operation 1001 to operation 1003 is the same as the description of operation 801 to operation 803 in FIG. 8, and thus duplicative description is omitted below.

At operation 1005, the electronic device 101 may transmit the signal including the passive scan time information to the external electronic device 102. According to an embodiment, the signal including the passive scan time information may be a signal based on the NAN communication standard (e.g., SDF, NAF, or BLE message), and may include data for synchronizing the passive scan time with at least one field constituting the signal. For example, in case of using the SDF, the passive scan time may be synchronized by using a service descriptor attribute field and a service descriptor extended attribute field. As another example, in case of using the NAF, one of reserved 14 to 255 of OUI Subtype may be selected, and the selected field may be utilized. As still another example, in case of using the BLE message, it may include information capable of discriminating the deactivation and activation of the NAN cluster merge, and may be transmitted. According to an embodiment, the electronic device 101 may synchronize the passive scan time information with the external electronic device 102, and may perform the short-range wireless communication based on the synchronized passive scan time information.

At operation 1007, the external electronic device 102 may determine whether to synchronize the passive scan. For example, the external electronic device 102 may display a user interface for synchronization determination on the display, and may determine whether to synchronize the passive scan based on user input. Alternatively, the external electronic device 102 may determine whether to synchronize the passive scan based on predetermined configuration information.

At operation 1009, the external electronic device 102 may transmit a response signal for the signal received at operation 1005 to the electronic device 101. For example, the response signal may include information related to the synchronization of the passive scan. If the external electronic device 102 determines the synchronization of the passive scan at operation 1007, the external electronic device 102 may transmit the response signal including the result of the determination to the electronic device 101. According to an embodiment, the synchronization of the passive scan may include an operation of sharing of the information related to the passive scan.

At operation 1011 and operation 1013, the electronic device 101 and the external electronic device 102 may synchronize the passive scan time based on the shared passive scan time information. At operation 1013, the electronic device 101 and the external electronic device 102 may perform wireless NAN communication based on the synchronized passive scan time information. The electronic device 101 and the external electronic device 102 belonging to the same cluster (e.g., first cluster) may synchronize a time point when the other NAN cluster (e.g., second cluster) is searched, and may participate in the other NAN cluster (e.g., second cluster) at substantially the same time. According to an embodiment, even if being merged into the other NAN cluster (e.g., second cluster), the electronic device 101 and the at least one external electronic device 102 may be merged substantially together based on the synchronized passive scan time information, and thus the quality of the wireless communication between the electronic device 101 and the at least one external electronic device 102 can be maintained.

Figure 11:
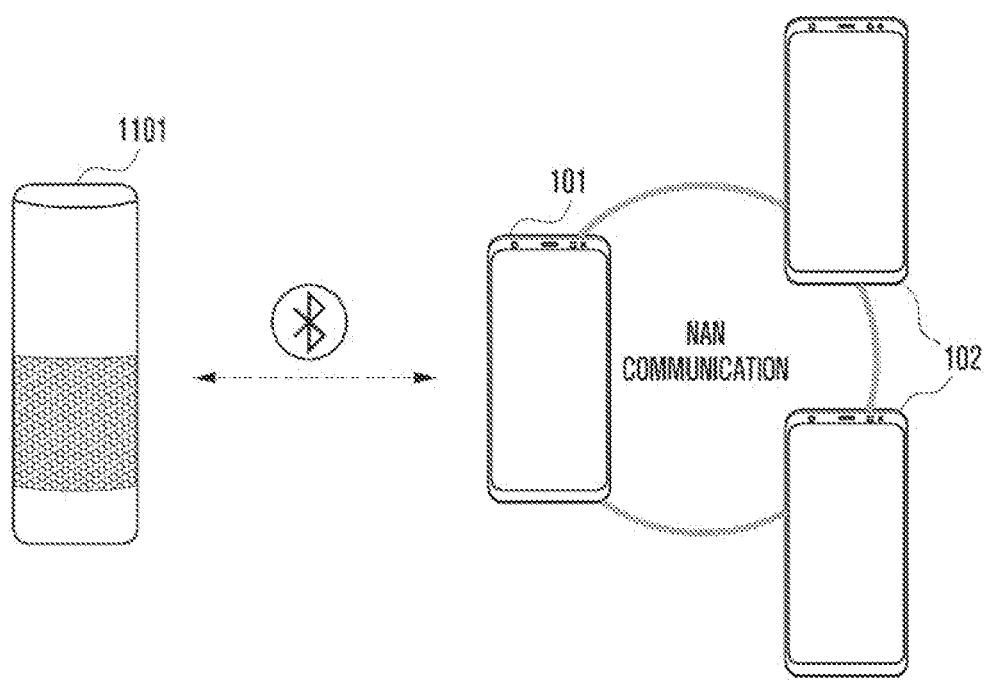
FIG. 11 is an exemplary diagram illustrating a process in which an electronic device included in a NAN cluster uses another external electronic device based on synchronized passive scan time information according to an embodiment of the disclosure.

FIG. 11 is an exemplary diagram illustrating a process in which an electronic device included in a NAN cluster uses another external electronic device based on synchronized passive scan time information according to an embodiment of the disclosure.

With reference to FIG. 11, the electronic device (e.g., electronic device 101 of FIG. 1) may perform NAN communication based short-range wireless communication with at least one external electronic device (e.g., electronic device 102 of FIG. 1). For example, the electronic device 101 and the at least one external electronic device 102 may form the same NAN cluster (e.g., first NAN cluster), and may share information related to the NAN communication. According to an embodiment, the electronic device 101 and the at least one external electronic device 102, belonging to the same NAN cluster (e.g., first NAN cluster) may deactivate the NAN cluster merge function. In using a service based on the first NAN cluster, the electronic device 101 and the at least one external electronic device 102 may be blocked from merging into another external NAN cluster (e.g., second NAN cluster). According to an embodiment, the electronic device 101 and the at least one external electronic device 102 may maintain the communication quality of the service based on the first NAN cluster without being affected by the second NAN cluster.

According to another embodiment, the electronic device 101 and the at least one external electronic device 102, belonging to the same NAN cluster (e.g., first NAN cluster) may synchronize the passive scan time. The electronic device 101 and the at least one external electronic device 102 may perform wireless NAN communication based on the synchronized passive scan time information. The electronic device 101 and the at least one external electronic device 102 may be merged into another NAN cluster substantially at the same time, or may participate in another service based on the NAN communication.

With reference to FIG. 11, the electronic device 101 may be in a connected state to another external electronic device (e.g., Bluetooth speaker 1101). The electronic device 101 may execute playback a music file stored in the memory (e.g., memory 130 of FIG. 1), and may play music through the Bluetooth speaker 1101. According to an embodiment, the electronic device 101 may belong to the same NAN cluster as that of the at least one external electronic device 102, and the electronic device 101 connected to the Bluetooth speaker 1101 may share the Bluetooth speaker 1101 with the at least one external electronic device 102. For example, in case that the at least one external electronic device 102 determines and plays a music file, the playback information of the music file may be transferred to the Bluetooth speaker 1101 through the electronic device 101.

According to an embodiment, the electronic device 101 and the at least one external electronic device 102, belonging to the same NAN cluster, may deactivate the cluster merge function to block the cluster merge into the other NAN cluster. The electronic device 101 and the at least one external electronic device 102, in which the merge function into the other NAN cluster is blocked, may be provided with a communication service for the NAN cluster without communication interruption.

According to an embodiment, the electronic device 101 and the at least one external electronic device 102, belonging to the same NAN cluster, may synchronize the passive scan time. If the passive scan time is synchronized, the electronic device 101 and the at least one external electronic device 102 may be merged into or may participate in the other NAN cluster substantially at the same time. The quality of the wireless communication between the electronic device 101 and the at least one external electronic device 102 may be maintained.

According to an embodiment, the electronic device 101 may include a wireless communication circuit 190 for performing short-range wireless communication with at least one external electronic device, a memory 130, and a processor 120 operatively connected to the wireless communication circuit 190 and the memory 130. The processor 120 may perform the short-range wireless communication with the at least one external electronic device 102 through the wireless communication circuit 190, form a first neighbor awareness networking (NAN) cluster with the at least one external electronic device based on the short-range wireless communication, transmit a short-range wireless signal including the passive scan time information to the at least one external electronic device 102 included in the first NAN cluster through the wireless communication circuit based on the discovery window section information corresponding to the first NAN cluster, and synchronize the passive scan time information with the at least one external electronic device 102 based on the short-range wireless signal.

According to an embodiment, the processor 120 may be merged into the second cluster together with the at least one external electronic device 102 based on the synchronized passive scan time information.

A short-range wireless communication method according to an embodiment may include: performing short-range wireless communication with at least one external electronic device 102 through a wireless communication circuit 190; forming a first NAN cluster with the at least one external electronic device 102 based on the short-range wireless communication; transmitting a short-range wireless signal including the passive scan time information to the at least one external electronic device 102 included in the first NAN cluster based on the discovery window section information corresponding to the first NAN cluster; and synchronizing the passive scan time information with the at least one external electronic device 102 based on the short-range wireless signal.

The method according to an embodiment may further include being merged into the other NAN cluster together with the at least one external electronic device 102 based on the synchronized passive scan time information.

A short-rage wireless communication system according to an embodiment may include a first electronic device (e.g., electronic device 101 of FIG. 1) functioning as a master, and a second electronic device (e.g., external electronic device 102 of FIG. 1) functioning as a slave. The short-range wireless communication system may perform the short-range wireless communication between the first electronic device (e.g., electronic device 101 of FIG. 1) and the second electronic device (e.g., external electronic device 102 of FIG. 1), form the first NAN cluster including the first electronic device (e.g., electronic device 101 of FIG. 1) and the second electronic device (e.g., external electronic device 102 of FIG. 1); transmit by the first electronic device (e.g., electronic device 101 of FIG. 1) the short-range wireless signal to the second electronic device (e.g., external electronic device 102 of FIG. 1) included in the first NAN cluster, and deactivate, by the second electronic device (e.g., external electronic device 102 of FIG. 1) the NAN cluster merge function of the second electronic device (e.g., external electronic device 102 of FIG. 1) using the short-range wireless signal.

According to an embodiment, the short-range wireless signal may include a service discovery frame of the NAN communication standard applied to the short-range wireless network, a NAN action frame (NAF), and/or a Bluetooth low energy (BLE) message, and may include information for controlling to deactivate the NAN cluster merge function for the second electronic device (e.g., external electronic device 102 of FIG. 1).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added. The embodiments of the disclosure disclosed in this specification and drawings only present a specific example in order to easily describe the technical contents according to an embodiment of the disclosure and to help an understanding of the embodiments of the disclosure, and they do not intend to limit the scope of the embodiments of the disclosure. Accordingly, all changes or modifications derived from the technical idea of various embodiments of the disclosure in addition to the embodiments described herein should be construed as being included in the scope of various embodiments of the disclosure without departing from the scope of the disclosure.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
   a wireless communication circuit configured to perform short-range wireless communication with at least one external electronic device;
   a memory; and
   a processor operatively connected to the wireless communication circuit and the memory, wherein the processor is configured to:
  perform the short-range wireless communication with the at least one external electronic device through the wireless communication circuit,
  form a first neighbor awareness networking (NAN) cluster with the at least one external electronic device based on the short-range wireless communication,
  transmit a short-range wireless signal to the at least one external electronic device included in the first NAN cluster, and
  deactivate a NAN cluster merge function of the at least one external electronic device using the short-range wireless signal.

2. The electronic device of claim 1, wherein the short-range wireless communication comprises a short-range wireless network based on a neighbor awareness networking (NAN) communication standard, and
  wherein the processor is configured to exchange information related to the short-range wireless communication with the at least one external electronic device through the wireless communication circuit based on discovery window section information corresponding to the first NAN cluster.

3. The electronic device of claim 2, wherein the processor is configured to exchange a beacon and a service discovery frame with the at least one external electronic device within the discovery window section, and
  wherein the discovery window section is time interval in which the electronic device and the at least one external electronic device are switched over from sleep state to wakeup state.

4. The electronic device of claim 1, wherein the short-range wireless signal comprises a service discovery frame of a NAN communication standard applied to the short-range wireless communication, a NAN action frame (NAF), and/or a Bluetooth low energy (BLE) message.

5. The electronic device of claim 1, wherein the short-range wireless signal comprises information for controlling deactivation of the NAN cluster merge function of the at least one external electronic device.

6. The electronic device of claim 1, wherein the processor is configured to:
  receive a response signal for determining whether to deactivate the NAN cluster merge function from the at least one external electronic device, and
  deactivate the NAN cluster merge function of the at least one external electronic device based on the response signal.

7. The electronic device of claim 1, wherein deactivation of the NAN cluster merge function comprises interruption of a passive scan function of the at least one external electronic device so that the at least one external electronic device is prevented from merging with a second NAN cluster.

8. The electronic device of claim 7, wherein the passive scan function comprises a function of searching and/or receiving beacon information being transmitted from an external electronic device included in the second NAN cluster.

9. The electronic device of claim 8, wherein the processor interrupts the passive scan function by not searching the beacon information corresponding to the second NAN cluster or by blocking reception of the beacon information.

10. The electronic device of claim 1, wherein the processor is configured to:
  transmit the short-range wireless signal including passive scan time information to the at least one external electronic device included in the first NAN cluster through the wireless communication circuit based on discovery window section information corresponding to the first NAN cluster,
  synchronize the passive scan time information with the at least one external electronic device based on the short-range wireless signal, and
  merge the at least one external electronic device into a second cluster based on the synchronized passive scan time information.

11. A short-range wireless communication method comprising:
  performing the short-range wireless communication with at least one external electronic device through a wireless communication circuit;
  forming a first NAN cluster with the at least one external electronic device based on the short-range wireless communication;
  transmitting a short-range wireless signal to the at least one external electronic device included in the first NAN cluster; and
  deactivating a NAN cluster merge function of the at least one external electronic device using the short-range wireless signal.

12. The method of claim 11, wherein the short-range wireless communication includes a short-range wireless network based on a neighbor awareness networking (NAN) communication standard, and
  the method further comprises exchanging information related to the short-range wireless communication with the at least one external electronic device through the wireless communication circuit based on discovery window section information corresponding to the first NAN cluster.

13. The method of claim 12, wherein further comprising:
  exchanging a beacon and a service discovery frame with the at least one external electronic device within the discovery window section, and
  wherein the discovery window section is time interval in which the electronic device and the at least one external electronic device are switched over from sleep state to wakeup state.

14. The method of claim 11, wherein the short-range wireless signal comprises information for controlling deactivation of the NAN cluster merge function of the at least one external electronic device.

15. The method of claim 11, wherein deactivating the NAN cluster merge function comprises:
  receiving a response signal for determining whether to deactivate the NAN cluster merge function from the at least one external electronic device; and
  deactivating the NAN cluster merge function of the at least one external electronic device based on the response signal.

16. The method of claim 11, wherein deactivation of the NAN cluster merge function comprises interruption of a passive scan function of the at least one external electronic device so that the at least one external electronic device is prevented from merging with a second NAN cluster.

17. The method of claim 16, wherein the passive scan function comprises a function of searching and/or receiving beacon information being transmitted from an external electronic device included in the second NAN cluster.

18. The method of claim 17, wherein interrupting the passive scan function further includes not searching the beacon information corresponding to the second NAN cluster or disregarding the received beacon information.

19. The method of claim 11, further comprising:
transmitting the short-range wireless signal including passive scan time information to the at least one external electronic device included in the first NAN cluster through the wireless communication circuit based on discovery window section information corresponding to the first NAN cluster;
synchronizing the passive scan time information with the at least one external electronic device based on the short-range wireless signal; and
merging the at least one external electronic device into a second cluster based on the synchronized passive scan time information.

20. The method of claim 11, wherein the short-range wireless signal comprises a service discovery frame of a NAN communication standard applied to the short-range wireless communication, a NAN action frame (NAF), and/or a Bluetooth low energy (BLE) message.

* * * * *